US009073061B2

(12) United States Patent
Goldbach et al.

(10) Patent No.: US 9,073,061 B2
(45) Date of Patent: Jul. 7, 2015

(54) HEAT STABILIZED COMPOSITE FILTER MEDIA AND METHOD OF MAKING THE FILTER MEDIA

(71) Applicant: W. L. Gore & Associates, Inc., Newark, DE (US)

(72) Inventors: James Theodore Goldbach, Paoli, PA (US); Wai Sing Poon, Hockessin, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 235 days.

(21) Appl. No.: 13/690,140

(22) Filed: Nov. 30, 2012

(65) Prior Publication Data
US 2013/0139691 A1   Jun. 6, 2013

Related U.S. Application Data

(60) Provisional application No. 61/566,418, filed on Dec. 2, 2011.

(51) Int. Cl.
*B01D 53/22*   (2006.01)
*B03C 3/34*   (2006.01)
*B01D 46/54*   (2006.01)
*B01D 46/00*   (2006.01)

(52) U.S. Cl.
CPC .............. *B03C 3/34* (2013.01); *Y10T 156/10* (2015.01); *B01D 46/543* (2013.01); *B01D 46/546* (2013.01); *B01D 46/0032* (2013.01)

(58) Field of Classification Search
CPC .. B01D 53/228; B01D 71/022; B01D 46/543; B01D 46/546; B01D 46/0032; C01B 3/505; B03C 3/34; Y10T 156/10
USPC ................ 55/486, 487; 96/4, 7, 11; 95/43, 45
See application file for complete search history.

(56) References Cited

U.S. PATENT DOCUMENTS 2,964,498 A   12/1960   Taylor
3,149,093 A   9/1964   Hecker et al.
(Continued)

FOREIGN PATENT DOCUMENTS

WO   WO 2006/056476   6/2006
WO   WO 2011/028661   3/2011

OTHER PUBLICATIONS

Johnson, et al. "Factors Affecting the Interaction of Polyolefin Additives with Fluorocarbon Elastomer Polymer Processing Aids" *Polymers Laminations and Coatings Conference*, TAPPI Proceedings, 1988, did not receive p. 249-256, received 18 pgs, No. 2-7.

*Primary Examiner* — Jason M Greene
*Assistant Examiner* — Anthony Shumate
(74) *Attorney, Agent, or Firm* — Amy L. Miller

(57) ABSTRACT

Composite filter media which are highly resistant to thermal degradation and retain filter efficiency and extended lifetime in high temperature environments are disclosed. Methods of making the filter media are also disclosed. A composite filter media for removal of particles from a gas stream includes a layer of a porous polymeric membrane, the layer having an upstream side and a downstream side relative to the direction of the gas stream; and at least one layer of an electrostatic microfiber web containing an antioxidant in an amount ranging from about 0.1% to about 10% by weight; the at least one layer of microfiber web disposed on the upstream side of the porous polymeric membrane layer.

56 Claims, 1 Drawing Sheet

(56) References Cited

U.S. PATENT DOCUMENTS

| | | |
|---|---|---|
| 3,255,151 A | 6/1966 | Hecker et al. |
| 3,335,104 A | 8/1967 | Kopacki et al. |
| 3,625,495 A | 12/1971 | Harter et al. |
| 3,662,032 A | 5/1972 | Kauder et al. |
| 3,728,399 A | 4/1973 | Spacht |
| 3,960,758 A | 6/1976 | Witte et al. |
| 3,972,759 A | 8/1976 | Buntin |
| 3,978,185 A | 8/1976 | Buntin et al. |
| 4,321,190 A | 3/1982 | Costanzi et al. |
| 4,622,259 A | 11/1986 | McAmish et al. |
| 4,892,784 A | 1/1990 | Reeves et al. |
| 5,401,446 A | 3/1995 | Tsai et al. |
| 5,707,569 A | 1/1998 | Priester et al. |
| 5,773,375 A * | 6/1998 | Swan et al. .................. 442/340 |
| 5,814,405 A | 9/1998 | Branca et al. |
| 5,969,026 A | 10/1999 | Mor et al. |
| 6,821,456 B2 * | 11/2004 | Semen .......................... 252/404 |
| 7,501,003 B2 | 3/2009 | Muller et al. |
| 7,910,658 B2 * | 3/2011 | Chang et al. .................. 525/191 |
| 8,273,068 B2 * | 9/2012 | Chang et al. ............. 604/385.22 |
| 8,721,827 B2 * | 5/2014 | Chang et al. ............. 156/244.11 |
| 8,784,542 B2 * | 7/2014 | Dullaert et al. .................... 96/12 |
| 2001/0018964 A1 * | 9/2001 | DeGregoria et al. ............ 165/54 |
| 2006/0079145 A1 | 4/2006 | Cox |
| 2006/0135691 A1 * | 6/2006 | Cernohous ....................... 525/71 |
| 2006/0155011 A1 * | 7/2006 | Frances et al. ................. 523/220 |
| 2006/0292357 A1 * | 12/2006 | Cernohous et al. ......... 428/304.4 |
| 2008/0302074 A1 | 12/2008 | Gebert et al. |
| 2010/0160502 A1 | 6/2010 | Schambony et al. |
| 2011/0004147 A1 | 1/2011 | Renati et al. |
| 2013/0108831 A1 * | 5/2013 | Wu et al. ....................... 428/138 |

* cited by examiner

HEAT STABILIZED COMPOSITE FILTER MEDIA AND METHOD OF MAKING THE FILTER MEDIA

RELATED APPLICATIONS

The present application is a regular application based on co-pending U.S. Provisional Patent Application 61/566,418 filed Dec. 2, 2011.

BACKGROUND OF THE INVENTION

1. Field of the Invention

The present invention relates to a composite filter media for removal of particles from air and gas streams, and specifically refers to a filter that is cleanable and durable in hot environments. The invention also particularly relates to the use of the filter media in filtration units intended to remove particles from a gas stream entering gas turbines. The filter media of the invention may also be used in filtration units utilized in a variety of other applications, such as internal combustion engines, gas compressors, HVAC systems, electronic cabinets cooling, industrial gas cleaning equipment, and the like.

2. Background

The removal of particulates from a gas stream has long been a practice in a variety of industrial fields. Conventional means for filtering particulates and the like from gas streams include, but are not limited to, filter bags, filter tubes, filter panels and filter cartridges. For convenience herein, the term "filter element" will be used to refer collectively to these types of filtration means.

Muller (U.S. Pat. No. 7,501,003) teaches a composite filter media comprising an electrostatically-charged melt blown layer and an expanded polytetrafluoroethylene membrane layer. The media has utility in filtering ambient air because of its high filter efficiency, long lifetime, and ability to resist water and salt penetration. Filter elements made with composite filter media can remove the submicron particles in air that cause corrosion and fouling of gas turbines. Filter elements comprising composite filter media are available from W.L. Gore & Associates, Inc. (Elkton, Md.).

Filters are often used in extreme temperature environments, which can range from extremely cold in arctic climate to extremely hot in desert environments. Consequently, the filter media and the materials of their construction must withstand wide temperature ranges while maintaining optimal functionality. Polypropylene, although commonly used in filter media, may be susceptible to thermal degradation due to oxidation. Unstabilized polypropylene can begin to decompose almost immediately after formation. At elevated temperatures and in the presence of air, polypropylene may disintegrate to an oxidized powder. Melt blown polypropylene webs are especially sensitive to thermal degradation due to their fine fibers and high surface area. When the polypropylene material of the web is degraded sufficiently, the fine melt blown fibers can crack and break.

In a composite filter media, a melt blown layer made of polypropylene may act as a prefilter to protect the expanded polytetrafluoroethylene membrane from a heavy load of dust particles. Melt blown media made with polypropylene is especially suitable for filtration due to its excellent efficiency, charge stability and low cost. At high temperature, the polypropylene melt blown layer may degrade thermally, causing the filter efficiency of the composite media to drop.

Filters are often cleaned by pulse-jet air or reverse air flow to dislodge the dust particles. This causes mechanical stress on the filters. The repeated mechanical stress and shear on the melt blown fibers may also act as an initiator of oxidation. Over time, the fibers may crack or break. This interferes with the cleaning process and causes the airflow resistance to increase rapidly, thus, reducing the lifetime of the filter.

Antioxidant may be added to polypropylene to improve its resistance to high temperatures. U.S. Pat. No. 4,892,784 Reeves et al. teaches the art of adding antioxidants to polypropylene webs by means of aqueous solution. After the melt blown is made, it is coated with antioxidants which are dissolved in aqueous solution. Many antioxidants are not soluble in water, however, which severely limits the choice of antioxidants. The extra coating step in Reeves, may also add cost and complexity to filter media construction.

U.S. Pat. No. 5,969,026 teaches the addition of low concentrations of antioxidants to the polypropylene resin. The amount of antioxidant is limited of 0.001 to 0.05 percent by weight. Higher concentrations cause process issues such as residues plating on the surface of the equipment. High concentrations of antioxidants can also cause other undesirable effects such as yellowing of the material. More importantly, high amount of antioxidants interferes with the visbreaking process during the melt blown production process. High melt flow is necessary for the melt blown process to produce fine fibers. During visbreaking, the melt flow characteristic of the polypropylene is increased. This is achieved by adding peroxide to the polypropylene resin which acts as free radicals to breakdown the molecular chains and decrease the polymer melt viscosity. Increasing the amount of antioxidant, however, typically interferes with this process because of the reaction between antioxidants and peroxide. To avoid these problems, antioxidant has been added to the polypropylene resin at very low concentrations in previous melt blown webs for filtration applications.

However, the issues involved with thermal degradation of melt blown webs in composite filter media applications remains unresolved.

There thus remains a need in the art for filter media which maintain filtration efficiency and cleanability for an extended period of time at elevated temperatures of filtration operation.

SUMMARY OF THE INVENTION

The present invention overcomes the temperature limitations and instabilities of the aforementioned composite filter media. By way of the invention, a high loading of antioxidants with at least 0.1 to 20% by weight, preferably 0.5% to 2%, is added to the microfiber resin and made into a microfiber web using conventional melt blown processes. The resulting melt blown web is highly resistant to thermal degradation and enables the composite filter media to retain filter efficiency and provide extended lifetime in high temperature environments of operation, such as hot and dusty climates.

Accordingly, an aspect of the present invention is a composite filter media for removal of particles from a gas stream comprising:

(a) a layer comprising a porous polymeric membrane, the layer having an upstream side and a downstream side relative to the direction of the gas stream; and (b) at least one layer of an electrostatic microfiber web containing an antioxidant in an amount ranging from about 0.1% to about 10% by weight; the at least one layer of microfiber web disposed on the upstream side of the porous polymeric membrane layer.

Yet another aspect then of the present invention is a method of making a composite filter media for removal of particles from a gas stream which comprises:

(a) providing a layer comprising a porous polymeric membrane, the layer having an upstream side and a downstream side relative to the direction of the gas stream; and (b) attaching at least one layer of an electrostatic microfiber web, containing an antioxidant in an amount ranging from about 0.1% to about 10% by weight, to the porous polymeric membrane layer; the at least one layer of the microfiber web being disposed on the upstream side of the porous polymeric membrane layer.

Another embodiment of the invention is a composite filter media additionally comprising a support layer disposed on the downstream or upstream side of the membrane layer.

Yet another embodiment of the invention is a composite filter media comprising at least one additional layer of an electrostatic microfiber web attached to the upstream side of the at least one layer of microfiber web.

The composite filter media of the present invention advantageously are highly resistant to thermal degradation and retain filter efficiency and extended lifetime in high temperature environments.

Accordingly, another aspect of the invention is a composite filter media having a filter efficiency which is greater than about 85% at 0.1 micron at 2.5 cm/s; and especially having a filter efficiency which is greater than about 85% at 0.1 micron at 2.5 cm/s when exposed to 100° C. for 10 days and pulse-cleaned for 36,000 cycles, as carried out by a "Pulse-Jet Test" as described herein.

Preferably, the filter efficiency is greater than about 95% at 0.1 micron at 2.5 cm/s, and especially greater than about 95% at 0.1 micron at 2.5 cm/s when exposed to 100° C. for 10 days and pulse-cleaned for 36,000 cycles.

Most preferably, the filter efficiency is greater than about 99.5% at 0.1 micron at 2.5 cm/s, and especially greater than about 99.5% at 0.1 micron at 2.5 cm/s when exposed to 100° C. for 10 days and pulse-cleaned for 36,000 cycles.

The invention provides composite filter media for assembly in filtration units intended to remove particles from a gas stream entering gas turbines. The composite filter media may also be used in filtration units used in a wide variety of other applications, such as internal combustion engines, gas compressors, HVAC systems, electronic cabinets cooling, industrial gas cleaning equipment, and the like.

DETAILED DESCRIPTION OF THE ILLUSTRATED EMBODIMENTS

Figure 1:
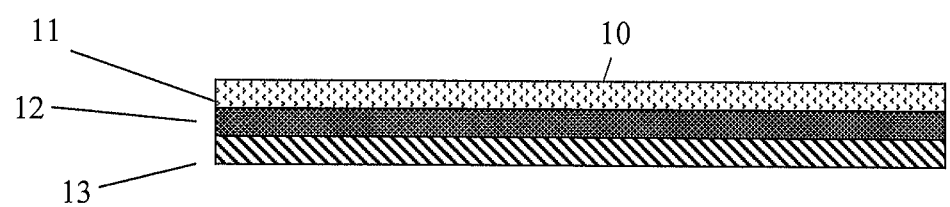
FIG. 1 shows a cross-sectional view of one embodiment of a composite filter media of the invention.

The present invention is directed to the art of filtration of particulates from air and gaseous streams and, more specifically, to a composite filter media for filtering such particulates, which is highly resistant to thermal degradation while retaining filter efficiency and extended lifetime in high temperature environments of operation. In another aspect, the composite filter media in accordance with the present invention is renewable by removing the upstream-most layer of the composite filter media.

The composite filter media of the present invention provides at least two filtration layers: a porous polymeric membrane filtration layer and at least one electrostatic microfiber web layer which is positioned upstream of the porous polymeric membrane layer relative to the direction of a gas stream flow. Optionally, the composite filter media may include a support layer. The support layer may be positioned either upstream or downstream of the porous polymeric membrane layer relative to the gas stream flow through the filter. Optionally, the support layer may be laminated to the membrane.

In one aspect, the composite filter media of the present invention is renewable. As used herein, a filter media is "renewable" when, after use, the filter media is capable of recovering at least 85% of its initial permeability while maintaining acceptable filtration efficiency. In this aspect, the composite filter is renewable by removing the upstream-most layer of microfiber web after use.

The composite filter media is preferably folded upon itself in a pleated fashion so as to provide better structural integrity and to significantly increase the exposed surface area for filtration. The composite media is pleated, such that the apices of the pleats are aligned. Pleated embodiments include, but are not limited to, a pleated cylinder and a pleat pack, which can be incorporated into V-shaped filter elements, which are suitable for use in the assembly of V-shaped panel filters.

The composite filter includes at least one melt blown polymer microfiber web. Preferably the at least one microfiber web layer is comprised of polypropylene.

Melt blown webs are produced by entraining melt spun fibers with convergent streams of heated air to produce extremely fine filaments. Melt blown processing forms continuous sub-denier fibers, with relatively small diameter fibers that are typically less than 10 microns. Melt blowing is known in the art and is described in U.S. Pat. No. 3,978,185; U.S. Pat. No. 3,972,759; and U.S. Pat. No. 4,622,259, which are incorporated herein by reference in their entireties.

The melt blown polymer fiber web layer(s) can be made from a variety of polymeric resin materials, including, but not limited to, polypropylene, polyester, polyamide, polyvinyl chloride, polymethylmethacrylate, polyethylene, and polytetrafluoroethylene. Polypropylene is the preferred polymeric material. Typically, the polymer fibers that form the web have a diameter in the range of about 0.5 µm to about 10 µm. Preferably, the fiber diameter is about 1 µm to about 5 µm.

The thickness of the microfiber web layers is not critical. If the microfiber web is a melt blown web, for example, the thickness may be from about 0.08 mm to about 3 mm. Greater thickness results in higher dust capacity; however, excessively thick microfiber web layers may limit the total number of layers that can be used in the composite filter media or increase initial pressure drop.

The selection of the basis weight of the microfiber web is also within the capability of those of skill in the art. The basis weight of a melt blown polymer fiber web may, for example, be in the range of about 1 g/m$^2$ to about 100 g/m$^2$, and preferably the basis weight of the melt blown fiber web is about 10 g/m$^2$ to about 50 g/m$^2$.

Stabilizers may be added to the polymeric resin to be processed. Non-limiting examples of suitable stabilizers include antioxidants, such as sterically-hindered phenols, such as disclosed in U.S. Pat. No. 3,960,758, U.S. Pat. No. 2,964,498, U.S. Pat. No. 3,335,104, U.S. Pat. No. 3,625,495, U.S. Pat. No. 3,728,399, U.S. Pat. No. 3,255,151, and U.S. Pat. No. 3,149,093; UV stabilizers including, but not limited to, sterically-hindered amines, such as disclosed in U.S. Pat. No. 4,321,190 and US 2010/0160502; phosphorus-containing stabilizers, such as phosphites or phosphonites, including such in combination with phenols, such as described in U.S. Pat. No. 3,662,032; charge stabilizers, such as described in US 2006/0079145 and US 2011/004147; acid scavengers, such as calcium stearate, zinc stearate, or dihydrotalcite, as well as calcium, zinc, and sodium caprylate salts, such as disclosed in U.S. Pat. No. 5,707,569. A preferred antioxidant is a combination of a sterically-hindered phenol and a UV stabilizer in a ratio of about 9:1. See also Johnson, et al., "Factors Affecting the Interaction of Polyolefin Additives with Fluorocarbon Elastomer Polymer Processing Aids" *Polymers Laminations and Coatings Conference*, TAPPI Proceedings, 249-256, 1988 and Danneels, "Low Molecular Weight Ionomers as Processing Aids and Additives" *High Performance Additives Conference* London, 14 pages, May 10, 1988.

The stabilizers used as described above are typically consumed during the resin processing and any residual amount remaining in the microfiber web is not sufficient to maintain the performance of the composite filter media.

By way of the invention, an antioxidant is added in an amount sufficient in the resin process, such that there is a sufficient residual amount of antioxidant present in the microfiber web to reduce oxidation and maintain the performance of the composite filter media. Filter media according to the invention are advantageously highly resistant to thermal degradation and retain filter efficiency and extended lifetime in high temperature environments.

By way of the invention then, an antioxidant is added to the polymeric resin material to be used in forming the melt blown microfiber web in an amount ranging from about 0.1% to about 20% by weight; preferably from about 0.1% to about 5% by weight; more preferably from about 0.25% to about 2.5% by weight; and most preferably from about 0.5% to about 2% by weight.

Peroxides may be added to the melt blowing process to enhance melt flow characteristics of a polymeric resin, such as polypropylene. Peroxides act as free radicals to breakdown the molecular chains of the polymer and decrease the polymer melt viscosity. Typically, alkyl and aryl peroxides such as, but not limited to, 2,5-Dimethyl-2,5-di-(t-butylperoxy)hexane, 2,5-Dimethyl-3-hexin-2,5-di-t-butylperoxide (DYBP), 3,6,9-Triethyl-3,6,9,-trimethyl-1,4,7-triperoxonane, Bis(tert-butylperoxyisopropyl)benzene, Di-t-amyl peroxide, and Di-cumyl peroxide have been utilized.

By way of the invention, the addition of peroxide is not necessary for providing a heat-stabilized microfiber melt blown web, which thus advantageously avoids problems previously encountered by the use of peroxides and antioxidant in more than minute amounts during melt blown processing described above. The addition of peroxide, as has been typically carried out in melt blown processing, is not necessary here and can thus be avoided.

Electrostatic charge can be imparted to melt blown fibrous webs to improve their filtration performance using a variety of known techniques.

For example, a suitable web is conveniently cold charged by sequentially subjecting the web to a series of electric fields, such that adjacent electric fields have substantially opposite polarities with respect to each other, in the manner taught in U.S. Pat. No. 5,401,446, to Tsai et al. As described therein, one side of the web is initially subjected to a positive charge while the other side of the web is initially subjected to a negative charge. Then, the first side of the web is subjected to a negative charge and the other side of the web is subjected to a positive charge. However, electret filter materials may also be made by a variety of other known techniques.

In another aspect then, the microfiber web layer is a nonwoven fibrous polymeric web, the fibers having an electrostatic charge. Preferably, the fibrous polymeric web is composed of polypropylene.

Preferably, the microfiber web layer also has a permeability of from 1 to 200 Frazier, and most preferably from 30 to 100 Frazier.

The microfiber web may contain additives to enhance filtration performance and may also have low levels of extractable hydrocarbons to improve performance. The fibers may contain certain melt processable fluorocarbons, for example, fluorochemical oxazolidinones and piperazines and compounds or oligomers that contain perfluorinated moieties. The use of such additives can be particularly beneficial to the performance of an electrically-charged web filter.

With respect to "renewable" filter media, a variety of techniques are useful to facilitate removal of an electrostatic microfiber web layer in a renewable composite filter media. A removable layer may be perforated to allow it to be torn from the remaining layers. Preferably, the perforations are in a pattern around the perimeter of the filter media. Alternatively, the layer may be crush cut with a dull blade. In dull blade crush cutting, a dull blade is forced through the layer such that the fiber web is separated. However, the use of a dull blade promotes entanglement of the cut fibers. The entangled fibers help keep the layer in position, but the filter media is easily separated at the cut line to remove the filter layer. In yet another removal method, a first microfiber web layer is bonded to a second microfiber layer only at the perimeter of the layers; to remove the layer, the unbonded portion of the first microfiber layer is torn from the bonded perimeter. In still another technique, a filter frame in which the filter media is disposed includes a sharp edge or "knife edge" at the perimeter of the filter frame. Each microfiber web layer is removed by tearing it against the knife edge. Any of the techniques described above may be used alone or in combination with other techniques described or known in the art.

Downstream of the microfiber web layer is a microporous polymeric membrane filtration layer. The microporous polymeric membrane is intended to capture particles that pass through the removable microfiber web layers. Microporous polymeric membranes have demonstrated dependability and reliability in removing particles and organisms from gaseous streams. Membranes are usually characterized by their polymeric composition, air permeability, water intrusion pressure, and filtration efficiencies.

A variety of microporous polymeric membranes can be used as the membrane filtration layer, depending on the requirements of the application. The membrane filter layer may be constructed from the following exemplary materials: nitrocellulose, triacetyl cellulose, polyamide, polycarbonate, polyethylene, polypropylene, polytetrafluoroethylene, polysulfone, polyvinyl chloride, polyvinylidene fluoride, and acrylate copolymer.

The porous polymeric membrane layer is preferably constructed from a hydrophobic material that is capable of preventing the passage of liquids. The porous polymeric membrane layer must be able to withstand the applied differential pressure across the filter media without any liquid passing through it. The preferred membrane has a water intrusion pressure of 0.05 bar to 1.5 bar and an average air permeability of about 7 Frazier to about 100 Frazier, and more preferably, an average air permeability of about 10 Frazier to about 40 Frazier.

Preferably, the porous polymeric membrane layer is a microporous fluoropolymer, such as ePTFE, fluorinated ethylenepropylene (FEP), and perfluoroalkoxy polymer (PFA). Polypropylene (PU), polyethylene (PE) or ultra high molecular weight polyethylene (uhmwPE) are also particularly suitable.

Most preferably, the porous polymeric membrane layer comprises ePTFE. Suitable ePTFE membranes are described in U.S. Pat. No. 5,814,405, which is incorporated herein by reference in its entirety. The membranes described therein have excellent filtration efficiency, high air flow, and burst strength. Methods of making suitable ePTFE membranes are fully described therein. However, ePTFE membranes constructed by other means can also be used.

In another aspect, the preferred membrane layer of ePTFE has a permeability of at least about 3 Frazier; more preferably at least about 15 Frazier; and most preferably at least about 80 Frazier.

The porous polymeric membrane layer may optionally contain a filler material to improve certain properties of the filter. Suitable fillers, such as carbon black, or other conductive filler, catalytic particulate, fumed silica, colloidal silica, or adsorbent materials, such as activated carbon or ceramic fillers, such as activated alumina and $TiO_2$, and methods preparing filled membranes useful in the present invention are fully described in U.S. Pat. No. 5,814,405.

A support layer may also be provided to maintain the filtration layers of the filter media in the proper orientation to gaseous flow. Preferred supporting material should be rigid enough to support the membrane and removable layers, but soft and supple enough to avoid damaging the membrane. The support layer should also be heat-resistant in order to withstand continuous high temperatures of filtration operation at above 40° C., more preferably at above 50° C., and most preferably at above 65° C. The support layer may comprise non-woven or woven fabrics. Other examples of suitable support layer materials may include, but are not limited to, woven and non-woven polyester, polypropylene, polyethylene, fiberglass, cellulose, cellulose blend, microfiberglass, and polytetrafluoroethylene. In a pleated orientation, the material should provide airflow channels in the pleats while holding the pleats apart (i.e., preventing the pleats from collapsing). Materials such as spun bonded non-wovens are particularly suitable for use in this application. A suitable example of such spun bonded non-woven support layer materials is polypropylene containing an antioxidant in an amount ranging from about 0.1% to about 10% by weight.

The support layer may be positioned upstream or downstream of the porous polymeric membrane layer. Optionally, a support material may be laminated to the porous polymeric membrane layer to form a base layer. In this aspect, the base layer advantageously provides both support to the overlaying melt blown media layers and acts as the final filtration surface. Bonding of the layers can be carried out by means of hot rolls using heat and pressure. More preferably, the polymeric layers can be point-bonded by ultrasonic as described by Gebert et al. in US 2008/0302074, which is incorporated herein by reference in its entirety.

In another aspect of the invention, the renewable composite filtration media according to the present invention is renewable by removal of the upstream-most microfiber web layer. When the renewable filter is placed within the flow of a fluid containing particles to be removed, there is an initial pressure drop across the filter media. As filtration takes place, particles will accumulate on the filtration media, primarily within the upstream-most microfiber web layer. As such particles accumulate, the pressure drop across the filter media will increase. When the pressure drop is unacceptable for the application, the filtration media in accordance with the present invention is renewed by removing the upstream-most microfiber web layer to expose the underlying clean filtration layer, which is either another microfiber web layer, the porous polymeric membrane layer or support layer. Upon removal of the upstream-most layer, the pressure drop across the filter media will be less than or equal to about 120% of the initial pressure drop across the filter media.

In yet another aspect then, the invention provides a renewable composite filter for removal of particles from a gas stream, the renewable composite filter comprising a filter frame; a pleated laminate comprising an ePTFE membrane and a support layer, the laminate having an upstream side and a downstream side relative to the direction of gas flow, the laminate disposed within the frame and having an air permeability of about 3 Frazier to about 15 Frazier, and a particle filtration efficiency of at least 85% for 0.1 micron sized particles; and at least one pleated electrostatically-charged microfiber web layer containing an antioxidant in an amount ranging from about 0.1% to about 10% by weight; having an air permeability of about 30 Frazier to about 150 Frazier and a particle filtration efficiency of at least 85% for 0.1 micron sized particles, the at least one pleated electrostatically-charged microfiber web layer disposed on the upstream side of the membrane such that the apices of the membrane and the microfiber layers are aligned, the microfiber web layer further comprising perforations adjacent to the frame; and wherein the microfiber web layer is removable from the frame by tearing at the perforations.

Figure 2:
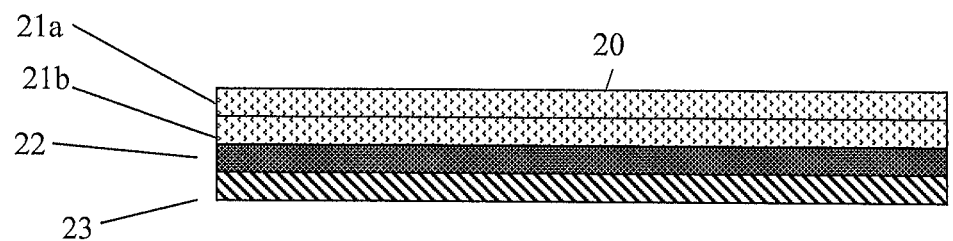
FIG. 2 shows a cross-sectional view of another embodiment of the composite filter media.

Referring to FIGS. 1 and 2, FIG. 1 shows a composite filter media 10 having an outermost layer 11 of an electrostatic microfiber melt blown web disposed upstream to a layer 12 of a porous polymeric membrane layer and a support layer 13 disposed downstream of the porous polymeric membrane layer 12.

FIG. 2 shows another embodiment of the composite filter media 20 having outermost layers 21a and 21b of an electrostatic microfiber melt blown web disposed upstream to a layer 22 of a porous polymeric membrane layer and a support layer 23 disposed downstream of the porous polymeric membrane layer 22.

The invention advantageously provides composite filter media having a filter efficiency which is greater than about 85% at 0.1 micron at 2.5 cm/s; and especially having a filter efficiency which is greater than about 85% at 0.1 micron at 2.5 cm/s when exposed to 100° C. for 10 days and pulse-cleaned for 36,000 cycles, as carried out by a "Pulse-Jet Test" as described herein.

Preferably, the filter efficiency is greater than about 95% at 0.1 micron at 2.5 cm/s, and especially greater than about 95% at 0.1 micron at 2.5 cm/s when exposed to 100° C. for 10 days and pulse-cleaned for 36,000 cycles.

Most preferably, the filter efficiency is greater than about 99.5% at 0.1 micron at 2.5 cm/s, and especially greater than about 99.5% at 0.1 micron at 2.5 cm/s when exposed to 100° C. for 10 days and pulse-cleaned for 36,000 cycles.

Test Methods

Permeability

Air permeability can be determined according to a Frazier test method. In this method, air permeability is measured by clamping a test sample in a gasket-flanged fixture, which provides a circular section of approximately 2.75 inches in diameter and 6 square inches in area for air flow measurement. The upstream side of the sample fixture is connected to a flow meter in line with a source of dry compressed air. The downstream side of the sample fixture is open to the atmosphere. Testing is accomplished by applying an air pressure of 0.5 inches of water to the upstream side of the sample and recording the flow rate of the air passing through the in-line flowmeter (a ball-float rotameter). The sample is conditioned at 21° C. and 65% relative humidity for at least 4 hours prior to testing. Results are reported in terms of Frazier Number which has units of cubic feet/minute/square foot of sample at 0.5 inches of water pressure.

Filtration Efficiency

The particle collection efficiency is measured by an automated efficiency tester (e.g., Model 3160, available from TSI, Inc., St Paul, Minn.). The test is performed at ambient room temperature (70° F.) and relative humidity conditions (40%). A dioctyl-phthalate (DOP) solution is atomized to generate an aerosol. The filter sample is challenged with the aerosol at air flow velocity of 2.5 or 5.3 cm/s. Two condensation nucleus particle counters measure the particle concentrations upstream and downstream of the test sample simultaneously. The particle collection efficiency is reported as the percentage of upstream challenge particles collected by the filter. The filtration efficiency is measured at 0.1 or 0.3 micron. The filtration efficiency E and penetration P are expressed as $$E = 100 - \frac{C_{down}}{C_{up}} \times 100\%$$

$$P = 100 - \frac{C_{down}}{C_{up}} \times 100\%$$

The specific quality of a filter is the ratio of the penetration to the airflow resistance. The higher the specific quality, the better is the filter. The formula is $$SQ = \frac{-\ln(P)}{(\Delta P/U)} \times 1,000 \quad \text{krayls}$$

where $\Delta P$ is the pressure drop of the filter (Pa), and U is the media face velocity (m/s).

Pulse-Jet Test

The filter is tested according to the ASTM D6830 method. The sample is mounted in the filter holder of the test rig. The face velocity is set to 2 m/min. The air is heated to 100° C. The testing is conducted in three stages. The test filter is seasoned by a test dust in the first stage. An aluminum oxide test dust is dispersed in air and collected by the test filter. Every 3 seconds, the test filter is cleaned by a pulse-jet of compressed air directed to the downstream side of the test filter to knock off the dust collected on the filter. This is repeated for 10,000 cycles. In the second stage, the frequency of the pulse-jet cleaning is triggered by the pressure drop of the test filter. Pulse-cleaning is initiated when the pressure drop reaches 1 kPa. The second stage is run for six hours. The number of cleaning cycles depends on the rate of pressure drop increase as the dust is loaded onto the test filter. Finally, the dust dispersion is stopped and only clean air is allowed to pass through the test filter in the third stage. The pulse-jet cleaning is done at 3 seconds interval, until the total number of cleaning cycles reaches 36,000 (including first and second stages). The test filter is inspected after the test completion and the filtration efficiency is measured.

EXAMPLES

Comparative Example 1

A melt blown filter media was made from polypropylene resin, having an MFR of 2100 g/10 min (ASTM D 1238, 230° C., 2.16 kg). The layer was made from melt blown processes as taught in U.S. Pat. Nos. 3,978,185; 3,972,759; and 4,622,259. The media had a basis weight of 30 g/m2, air permeability of 40 Frazier. The melt blown layer was charged by an electrostatic charging process as taught in U.S. Pat. No. 5,401,446, to Tsai et al. No antioxidant was added to the resin or in the process steps. The airflow resistance and filtration efficiency are shown in Table 1. The melt blown of Comparative Example 1 had a particle collection efficiency of 93.909% with a pressure drop of 3.3 mmwg. The specific quality was 4.5 krayls.

Example 1

A melt blown filter media was made from a Metallocene-based polypropylene resin, having an MFR of 1550 g/10 min (ASTM D 1238, 230° C., 2.16 kg). A master batch was prepared by compounding 20% by weight of an antioxidant package into the resin. The antioxidant package was made of 91% Irganox 1010 and 9% Tinuvin 770 by weight. The master batch was added to the resin at a ratio that results in 2% antioxidants by weight of the modified resin. The resultant batch was compounded to ensure uniformity of the antioxidant. The melt blown microfiber web was produced by the same process as in Comparative Example 1. The media had a basis weight of 30 g/m². The melt blown layer was charged by an electrostatic charging process as taught in U.S. Pat. No. 5,401,446, to Tsai et al.

The result of the filtration efficiency test is shown in Table 1. The particle collection efficiency was 89.857% and the pressure loss was 1.6 mmwg. Surprisingly, the specific quality factor of this example was higher than the melt blown in Comparative Example 1. Increasing the amount of antioxidant was expected to decrease the filtration efficiency because the antioxidant may interfere with the melt blown or electrostatic charging process. The evidence shows that the melt blown microfiber web made with high loading of antioxidants (2% by weight) resulted in improvement to the filtration efficiency.

Comparative Example 2

A composite filter media was made by ultrasonically bonding three layers of materials. The melt blown described in Comparative Example 1 was used in this example in combination with layers of a microporous membrane, and a support substrate. A microporous ePTFE membrane having an air permeability in the range of 18 to 29 Frazier, ball burst strength greater than 0.2 bar, and weight of about 5 g/m² was used as the microporous membrane layer. A polyester spunbond media with an air permeability of 130 Frazier, basis weight of about 100 g/m², and tensile strength of 105 lbs in the machine direction and 75 lbs/in in the cross web direction was used as the support substrate layer. The three layers were point bonded by ultrasonic to produce a laminate with discrete bond points.

The filtration efficiency of this composite media is shown in Table 2. Comparative Example 2 had a collection efficiency of 99.970% and a pressure loss of 6.7 mmwg.

Example 2

A composite filter media was made by ultrasonically bonding three layers of materials. The melt blown described in Example 1 was used in this example in combination with layers of a microporous membrane, and a support substrate. A microporous ePTFE membrane having an air permeability in the range of 18 to 29 Frazier, ball burst strength greater than 0.2 bar, and weight of about 5 g/m² was used as the microporous membrane layer. A polyester spunbond media with an air permeability of 130 Frazier, basis weight of about 100 g/m², and tensile strength of 105 lbs in the machine direction and 75 lbs/in the cross web direction was used as the support substrate layer. The three layers were point bonded by ultrasonic to produce a laminate with discrete bond points.

The filtration efficiency is shown in Table 2. Example 2 with 2% antioxidant provided comparable filtration efficiency to Comparative Example 2. The specific quality was lower, 2.3 versus 3.1 krayls.

The pulse-jet cleaning shows that the composite media of Example 2 was clearly more durable than the composite media of Comparative Example 2, as shown in Table 3. The filtration efficiency for Comparative Example 2 after 231 hours in an oven set to 100° C. was 85.537% after 36,000 pulsing cycles. This was greatly reduced from the initial 99.970%. The specific quality factor dropped precipitously to 0.42 krayls. After 231 hrs in the oven, the melt blown had weakened to the point that the 36,000 pulsing cycles caused the melt blown web to breakup and detach from the ePTFE membrane surface.

In contrast, the filter efficiency of Example 2 was virtually unchanged. There was only a slight decrease in filtration efficiency from 99.883% to 99.531% after 673 hours at 100° C. The specific quality was 1.21, three times higher than Comparative Example 2 which failed in 231 hours. Upon inspection, the melt blown microfiber web of Example 2 was unchanged before and after the heat exposure and 36,000 pulse-jet cleaning cycles.

TABLE 1

Physical properties and filtration performance of melt blown

|  |  | Comparative Example 1 | Example 1 |
|---|---|---|---|
| Antioxidants Weight | % | N/A | 2 |
| Basis Weight | g/m² | 29.3 | 32.7 |
| Thickness | mils | 11.8 | 9.8 |
| Airflow Resistance (5.3 cm/s) | mmwg | 3.3 | 1.6 |
| Filter Efficiency (0.3 µm, 5.3 cm/s) | % | 93.909% | 89.857% |
| Specific Quality, krayls | krayls | 4.5 | 7.9 |

TABLE 2

Physical properties and initial filtration performance of composite media.

|  |  | Comparative Example 2 | Example 2 |
|---|---|---|---|
| Antioxidants Weight | % | N/A | 2 |
| Basis Weight, g/m² | g/m² | 130 | 133 |
| Thickness, mils | mils | 19.3 | 18.9 |
| Airflow Resistance (2.5 cm/s) | mmwg | 6.7 | 8.4 |
| Filter Efficiency (0.1 µm, 2.5 cm/s) | % | 99.970% | 99.944% |
| Specific Quality, krayls | krayls | 3.1 | 2.3 |

TABLE 3

Properties of composite filter media after exposure to 100 C. in oven and 36,000 pulse-cleaning cycles at 100 C.

|  | Unit | Comparative Example 2 | Example 2 |
|---|---|---|---|
| Antioxidants Weight (meltblown) | % | N/A | 2 |
| Time Exposed to 100° C. | hr | 231 hr | 673 hr |
| Total Cleaning Cycles at 100° C. | cycles | 36,000 | 36,000 |
| Airflow Resistance (2.5 cm/s) | mmwg | 11.6 | 11.3 |
| Filter Efficiency (0.1 µm, 2.5 cm/s) | % | 85.537% | 99.531% |
| Specific Quality | krayls | 0.42 | 1.21 |

The examples of the invention show that highly heat-resistant composite filter media which maintain high filter efficiency capabilities over an extended period of time at high temperatures of operation are provided by way of the invention.

What is claimed is:

1. A composite filter media for removal of particles from a gas stream comprising:
    (a) a layer comprising a porous polymeric membrane, the layer having an upstream side and a downstream side relative to the direction of the gas stream; and
    (b) at least one layer of an electrostatic microfiber web containing an antioxidant in an amount ranging from about 0.1% to about 10% by weight; the at least one layer of microfiber web disposed on the upstream side of the porous polymeric membrane layer.

2. The filter media of claim 1, wherein the amount of antioxidant ranges from about 0.1% to about 5% by weight.

3. The filter media of claim 2, wherein the amount of antioxidant ranges from about 0.25% to about 2.5% by weight.

4. The filter media of claim 3, wherein the amount of antioxidant ranges from about 0.5% to about 2% by weight.

5. The filter media of claim 1, wherein the porous polymeric membrane layer comprises expanded polytetrafluoroethylene (ePTFE).

6. The filter media of claim 1, wherein the microfiber web is made from a material selected from the group consisting of polypropylene, polyethylene, polyester, polyethylene copolymer, polyamide, polyvinylchloride, polymethylmethacrylate, and a melamine-containing polymer.

7. The filter media of claim 6 wherein the microfiber web is polypropylene.

8. The filter media of claim 1, wherein the antioxidant is selected from the group consisting of a sterically-hindered phenol, a sterically-hindered amine, a UV stabilizer, a phosphorus-containing stabilizer, a charge stabilizer and an acid scavenger.

9. The filter media of claim 1, wherein the antioxidant is a combination of a sterically-hindered phenol and a UV stabilizer.

10. The filter media of claim 1, wherein the microfiber web is produced without the addition of peroxide.

11. The filter media of claim 1 which further comprises a support layer.

12. The filter media of claim 11 wherein the support layer is made from a material selected from the group consisting of polypropylene, polyester, polyethylene, fiberglass, cellulose, cellulose blend, microfiber glass and polytetrafluoroethylene.

13. The filter media of claim 12 wherein the support layer is polypropylene which contains an antioxidant in an amount ranging from about 0.1% to about 10% by weight.

14. The filter media of claim 11 wherein the support layer is disposed on the downstream side of the membrane layer.

15. The filter media of claim 11 wherein the support layer is disposed on the upstream side of the membrane layer.

16. The filter media of claim 1 further comprising at least one additional layer of an electrostatic microfiber web upstream of the at least one layer of microfiber web.

17. The filter media of claim 1 wherein the layers are point-bonded.

18. The filter media of claim 1 having a filter efficiency which is greater than about 85% at 0.1 micron at 2.5 cm/s.

19. The filter media of claim 18 wherein the filter efficiency is greater than about 95% at 0.1 micron at 2.5 cm/s.

20. The filter media of claim 19 wherein the filter efficiency is greater than about 99.5% at 0.1 micron at 2.5 cm/s.

21. The filter media of claim 1 having a filter efficiency which is greater than about 85% at 0.1 micron at 2.5 cm/s when exposed to 100° C. for 1 O days and pulse-cleaned for 36,000 cycles.

22. The filter media of claim 21 wherein the filter efficiency is greater than about 95% at 0.1 micron at 2.5 cm/s when exposed to 100° C. for 10 days and pulse-cleaned for 36,000 cycles.

23. The filter media of claim 22 wherein the filter efficiency is greater than about 99.5% at 0.1 micron at 2.5 cm/s when exposed to 100° C. for 10 days and pulse-cleaned for 36,000 cycles.

24. The filter media of claim 1 in which the filter media is pleated.

25. The filter media of claim 24 in which the filter media is shaped as a pleated cylinder.

26. The filter media of claim 24 in which the pleated filter media forms a pleat pack comprising a plurality of pleats.

27. The filter media of claim 26 in which the pack is assembled into a V-shaped filter element.

28. The filter media of claim 27 in which at least one V-shaped filter element is further assembled into a V-shaped panel filter.

29. A method of making a composite filter media for removal of particles from a gas stream which comprises:
   (a) providing a layer comprising a porous polymeric membrane, the layer having an upstream side and a downstream side relative to the direction of the gas stream; and
   (b) fabricating an electrostatic microfiber web by:
      preparing a master batch comprising resin and an antioxidant at a first percentage by weight of the master batch;
      performing a melt blown process using the master batch to create a resulting microfiber web, so that the resulting microfiber web comprises the antioxidant at a second percentage by weight of the resulting microfiber web, wherein the second percentage by weight is lower than the first percentage by weight, and wherein the second percentage by weight is in an amount ranging from about 0.1% to about 10% by weight; and
      charging the resulting microfiber web to create the electrostatic microfiber web;
   (c) attaching at least one layer of an electrostatic microfiber web to the porous polymeric membrane layer; the at least one layer of the microfiber web being disposed on the upstream side of the porous polymeric membrane layer.

30. The method of claim 29 wherein the layers are attached by point-bonding.

31. The method of claim 29, wherein the amount of antioxidant ranges from about 0.1% to about 5% by weight.

32. The method of claim 31, wherein the amount of antioxidant ranges from about 0.25% to about 2.5% by weight.

33. The method of claim 32 wherein the amount of antioxidant ranges from about 0.5% to about 2%.

34. The method of claim 29, wherein the porous polymeric membrane layer comprises expanded polytetrafluoroethylene (ePTFE).

35. The method of claim 29, wherein the microfiber web is made from a material selected from the group consisting of polypropylene, polyethylene, polyester, polyethylene copolymer, polyamide, polyvinylchloride, polymethylmethacrylate, and a melamine-containing polymer.

36. The method of claim 35, wherein the microfiber web is polypropylene.

37. The method of claim 29 wherein the antioxidant is selected from the group consisting of a sterically-hindered phenol, a sterically-hindered amine, a UV stabilizer, a phosphorus-containing stabilizer, a charge stabilizer, and an acid scavenger.

38. The method of claim 37 wherein the antioxidant is a combination of a sterically-hindered phenol and a UV stabilizer.

39. The method of claim 29, wherein the microfiber web is produced without the addition of peroxide.

40. The method of claim 29 which further comprises attaching a support layer.

41. The method of claim 40, wherein the support layer is made from a material selected from the group consisting of polypropylene, polyester, polyethylene, fiberglass, cellulose, cellulose blend, microfiber glass and polytetrafluoroethylene.

42. The method of claim 40, wherein the support layer is disposed on the downstream side of the membrane layer.

43. The method of claim 40, wherein the support layer is disposed on the upstream side of the membrane layer.

44. The method of claim 29 further comprising attaching at least one additional layer of an electrostatic microfiber web to the upstream side of the at least one layer of microfiber web.

45. The method of claim 29 wherein the filter media has a filter efficiency which is greater than about 85% at 0.1 micron at 2.5 cm/s.

46. The method of claim 45 wherein the filter efficiency is greater than about 95% at 0.1 micron at 2.5 cm/s.

47. The method of claim 46 wherein the filter efficiency is greater than about 99.5% at 0.1 micron at 2.5 cm/s.

48. The method of claim 29 wherein the filter media has a filter efficiency which is greater than about 85% at 0.1 micron at 2.5 cm/s when exposed to 100° C. for 10 days and pulse-cleaned for 36,000 cycles.

49. The method of claim 48 wherein the filter efficiency is greater than about 95% at 0.1 micron at 2. 5 cm/s when exposed to 100° C. for 10 days and pulse-cleaned for 36,000 cycles.

50. The method of claim 49 wherein the filter efficiency is greater than about 99.5% at 0.1 micron at 2.5 cm/s when exposed to 100° C. for 10 days and pulse-cleaned for 36,000 cycles.

51. The method of claim 29 in which the filter media is pleated.

52. The method of claim 51 in which the filter media is shaped as a pleated cylinder.

53. The method of claim 51 in which the pleated filter media is disposed within a filter frame.

54. The method of claim 51 in which the pleated filter media forms a pleat pack comprising a plurality of pleats.

55. The method of claim 54 in which the pack is assembled into a V-shaped filter element.

56. The method of claim 55 in which at least one V-shaped filter element is further assembled into a V-shaped panel filter.

* * * * *